United States Patent

Shibatoh et al.

[11] Patent Number: 6,025,433
[45] Date of Patent: Feb. 15, 2000

[54] THERMOSETTING PAINT COMPOSITION

[75] Inventors: Kishio Shibatoh, Kanazawa-Ku; Souichi Mori, Yokohama; Yasuhiro Monma, Kagawa, all of Japan

[73] Assignee: BASF Coatings AG, Glasuritstrasse 1, Germany

[21] Appl. No.: 09/091,629

[22] PCT Filed: Nov. 22, 1995

[86] PCT No.: PCT/EP96/05160

§ 371 Date: Jul. 21, 1998

§ 102(e) Date: Jul. 21, 1998

[87] PCT Pub. No.: WO97/22672

PCT Pub. Date: Jun. 26, 1997

[30] Foreign Application Priority Data

Dec. 20, 1995 [JP] Japan .................................. H7-332274

[51] Int. Cl.[7] ................. C08J 3/00; C08K 3/20; C08L 75/00; C08F 8/30; C08F 283/04
[52] U.S. Cl. .............................. 524/590; 524/86; 524/87; 524/91; 524/92; 524/94; 524/323; 524/589; 524/590; 524/59; 524/839; 524/840; 525/123; 525/124; 525/455
[58] Field of Search ...................... 524/589, 590, 524/839, 840, 591, 86, 87, 91, 92, 94, 323; 525/123, 455, 124

[56] References Cited

U.S. PATENT DOCUMENTS 5,279,862  1/1994  Corcoran et al. .

FOREIGN PATENT DOCUMENTS

| 0 029 598 A1 | 11/1980 | European Pat. Off. .......... C09D 3/81 |
| WO 95/06674 | 8/1994 | European Pat. Off. ........ C08G 18/80 |
| WO 95/20003 | 1/1995 | European Pat. Off. ........ C08G 18/62 |
| 3 109 604 A1 | 3/1981 | Germany ....................... B32B 27/30 |
| 4-246483 | 4/1992 | Japan ........................... C09D 175/04 |
| 5-86164 | 5/1993 | Japan ............................. C08G 18/80 |

*Primary Examiner*—Patrick D. Niland

[57] ABSTRACT

To offer thermosetting paint compositions resistant to yellowing to brass, which give paint films of excellent resistance to yellowing due to brass, low-temperature curability, weather resistance, resistance to yellowing after stoving, acid resistance, scratch resistance, solvent resistance, adhesion and appearance. Thermosetting paint compositions, which are thermosetting paint compositions which are resistant to yellowing due to brass, characterized in that the paint-film-forming components include (A) a compound which has per molecule at least 2 functional groups which can react with an isocyanate group, at 49.6–90 wt %, (B) a blocked isocyanate which has par molecule at least 2 isocyanate groups blocked by an azole blocking agent, at 9.6–50 wt %, (C) an ultraviolet absorber and/or free radical scavenger, at 0.2–5 wt %, (D) an organotin compound at 0.1–3 wt %, and (E) an amino resin at 0.1–30 wt %.

8 Claims, No Drawings

THERMOSETTING PAINT COMPOSITION

BACKGROUND OF THE INVENTION

The present invention relates to thermosetting paint compositions which are resistant to yellowing due to brass, and more specifically it relates to single pack thermosetting paint compositions suitable as top finishing coat paints for automobiles.

PRIOR ART

In recent years rain stains due to acid rain and abrasions produced when washing cars have become a problem, and the development of paints to resolve this problem has become urgent.

In Japanese Unexamined Patent 4-2464 83 a paint composition is recorded in which the main components are a hydroxyl-group-containing acrylic resin and/or polyester resin, an alkylated melamine resin, an oxime-blocked isocyanate and an organotin compound, giving a paint composition which gives paint films of outstanding acid resistance and scratch resistance is obtained by crosslinking the unreacted melamine and unreacted hydroxyl groups.

However, because an oxime derivative is used as the isocyanate blocking agent in this paint composition yellowing after stoving and yellowing due to brass are problems. Yellowing after stoving here is the phenomenon of yellowing of the paint film after stoving when forming the hardened paint film, and yellowing due to brass is the phenomenon of yellowing of the paint or of the stoved paint film due to contamination with copper ions eluted from bras components present in the paint-making process or in some of the paint piping, valves and/or couplings in the painting line, for example. The reason for yellowing due to brass is thought to be that oxime derivatives used as isocyanate blocking agents form complexes with copper ions.

Similarly, in WO95/06674 a thermosetting paint composition is recorded which does not include an amino resin, in which an acrylic resin is employed as the principal resin with a blocked isocyanate blocked with a pyrazole derivative, and it is claimed that this gives paint films of outstanding acid resistance and resistance to yellowing after stoving.

However, this paint composition is inadequate in low-temperature curability and the weather resistance of the paint films is inadequate. Moreover, it is not claimed that paint films of outstanding resistance to yellowing due to brass are obtained.

In Japanese Unexamined Patent 5-86164 a thermosetting composition is described which contains a blocked isocyanate in which the isocyanate group is blocked with a pyrazole or imidazole derivative, and a primary or secondary polyamine.

However, this thermosetting composition is a thermosetting composition for adhesives, and paint film performance is inadequate when it used as a paint. Moreover, it is not claimed that it gives paint films of outstanding resistance to yellowing due to brass.

The purpose of the present invention is to offer thermosetting paint compositions resistant to yellowing due to bras which have outstanding resistance to yellowing due to brass and low-temperature curability, and can form paint films of outstanding yellowing after stoving, acid resistance, scratch resistance, solvent resistance, adhesion and appearance.

SUMMARY OF THE INVENTION

The present invention is the following thermosetting paint compositions.

(1) A thermosetting paint composition, which is a thermosetting paint composition which is resistant to yellowing due to brass, characterized in that the paint-film-forming components include
  (A) a compound which has per molecule at least 2 functional groups which can react with an isocyanate group, at 49.6–90 wt %,
  (B) a blocked isocyanate which has per molecule at least 2 isocyanate groups blocked by an azole blocking agent, at 9.6–50 wt %,
  (C) an ultraviolet absorber and/or free radical scavenger, at 0.2–5 wt %,
  (D) an organotin compound at 0.1–3 wt %, and
  (E) an amino resin at 0.1–30 wt %.

(2) A thermosetting paint composition according to (1) above, in which the functional groups in component (A) are hydroxyl groups, amino groups, epoxy groups, amide groups, urethane groups or active methylene groups.

(3) A thermosetting paint composition according to (1) above, in which component (A) is an acrylic resin which contains hydroxyl groups.

(4) A thermosetting paint composition according to (1) above, in which component (A) is a polymer which includes a structural unit represented by the general formula (1)

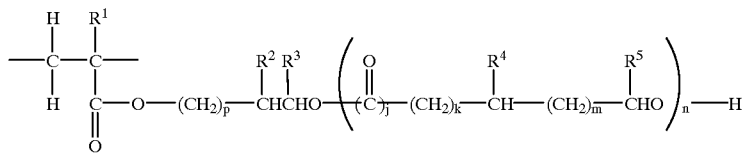

(1)

(In the formula $R^1$–$R^5$, which can be the same or different, are a hydrogen atom or a methyl group. p is an integer 0–2, j is an integer 0–3, m is an integer 0–3, and n is an integer 1–10.)

(5) A thermosetting paint composition according to any of (1) to (4) above, in which component (B) is an aliphatic and/or alicyclic polyisocyanate resin in which the isocyanate groups are blocked by pyrazole or a pyrazole derivative.

(6) A thermosetting paint composition according to any of (1) to (5) above, in which an ultraviolet absorber of component (C) is a benzotriazole compound, an oxaloanilide compound, a triazine compound, a benzophenone compound or a cyanoacrylate compound.

(7) A thermosetting paint composition according to any of (1) to (6), in which a free radical scavenger of component (C) is a hindered amine compound or a hindered phenol compound.

(8) A thermosetting paint composition according to any of (1) to (7), which contains in addition to components (A)–(E) a blocked isocyanate other than component (B), in a proportion of 0–30 parts by weight to 100 parts by weight of the total of components (A)–(E).

DETAILED DESCRIPTION OF THE INVENTION

Component (A) employed within the present invention is a compound which has per molecule at least one functional groups which can react with an isocyanate group, such as hydroxyl groups, amino groups, epoxy groups, amide groups, urethane groups or active methylene groups, etc., for example. It is desirable that the number average molecular weight of this compound is 500–20,000, and it is preferably 1000–10,000.

Examples of compounds as component (A) containing hydroxyl groups include acrylic resins containing hydroxyl groups, polyester resins containing hydroxyl groups and fluorine resins containing hydroxyl groups, etc.

Acrylic resins containing hydroxyl groups as component (A) include copolymers obtained by known free radical polymerization of a hydroxyl-group-containing vinyl monomer and other vinyl monomer(s).

Examples of hydroxyl-group-containing vinyl monomers above include hydroxyalkyl esters such as 2-hydroxyethyl (meth)acrylate, 2-hgydroxypropyl (meth)acrylate, 3-hydroxypropyl (meth)acrylate and hydroxybutyl (meth)acrylates, etc., monoethers of polyether polyols such as polyethylene glycol, polypropylene glycol and polybutylene glycol, etc., and hydroxyl-group-containing vinyl monomers such as 2-hydroxyethyl (meth)acrylate, etc., addition products of an ",$-unsaturated carboxylic acid and monoepoxy compounds such as Cardura E10 (trade mark Shell Petrochemicals) or "-olefin epoxides, etc., addition products of glycidyl (meth)acrylate and monobasic acids such as acetic acid, propionic acid, p-tertbutylbenzoic acid and fatty acids, etc., monomers or diesters of vinyl monomers containing an acid anhydride group, such as maleic acid or itaconic acid, etc., and glycols such as ethylene glycol, hexane-1,6-diol and neopentyl glycol, etc., hydroxyalkyl vinyl ethers such as hydroxyethyl vinyl ether, etc., hydroxyl-group-containing compounds represented by the general formula (2)

hydroxyl-group-containing resin as component (A) outstanding scratch resistance can be conferred on the paint film. Hydroxyl-group-containing monomers represented by General Formula (2) can be employed as part of all of the hydroxyl group donor in the acrylic resin containing hydroxyl groups.

Examples of other vinyl monomers which can be free radical polymerized with vinyl monomers containing hydroxyl groups include $C_1$–$C_{18}$ alkyl or cycloalkyl esters of (meth)acrylic acid, such as methyl (meth)acrylate, ethyl (meth)acrylate, propyl (meth)acrylate, n-butyl (meth)acrylate, i-butyl (meth)acrylate, t-butyl (meth)acrylate, 2-ethylhexyl (meth)acrylate, cyclohexyl (meth)acrylate, n-octyl (meth)acrylate, lauryl (meth)acrylate, dodecyl (meth)acrylate, stearyl (meth)acrylate and cyclohexyl [sic] (meth)acrylate, etc., and vinyl monomers such as styrene, styrene derivatives, acrylonitrile, acrylamide, vinyltoluene, vinyl acetate, glycidyl methacrylate, acrylic acid and methacrylic acid, etc. These can be employed singly or they can be employed in combinations of 2 or more.

Polyesters containing hydroxyl groups as component (A) include products of esterification of a polyvalent alcohol an a polybasic acid or anhydride thereof.

Examples of polyvalent alcohols above include ethylene glycol, propylene glycol, butylene glycol, hexane-1,6-diol, diethylene glycol, diproylene glycol, neopentyl glycol, triethylene glycol, glycerol, trimethylolethane, trimethylolpropane, ditrimethylolpropane, pentaerythritol, dipentaerythritol and carbitol, etc. These can be employed singly or they can be employed in combinations of 2 or more.

Examples of polybasic acids and anhydrides thereof include phthalic acid, phthalic anhydride, isophthalic acid, terephthalic acid, succinic acid, succinic anhydride, adipic acid, azelaic acid, sebacic acid, tetrahydrophthalic anhydride, hexahydrophthalic anhydride, maleic anhydride, fumaric acid, itaconic acid and trimellitic anhydride, etc. These can be employed singly or in combinations of 2 or more.

Examples of fluorine resins containing hydroxyl groups as component (A) include the Asahi Glass product Rumifuron, the Central Glass product Sefralcote, the Dainippon Ink and (2)

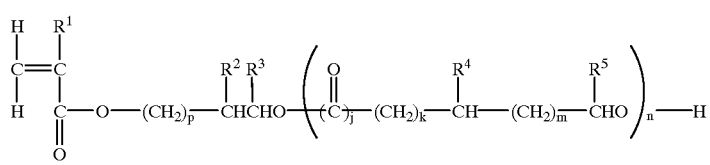

(In the formula $R^1$–$R^5$, p, j, k, m and n are as previously described), such as lactone-modified vinyl monomers of 1–10 mol of lactone such as ,-caprolactone, $-methyl-*-valerolactone, (-valerolactone, *-caprolactone, (-caprolactone, $-propiolactone and (-butyrolactone, etc., added to 1 mol of hydroxyalkyl ester such as 2-hydroxyethyl (meth)acrylate, 2-hydroxypropyl (meth)acrylate and hydroxybutyl (meth)acrylate, etc.

These vinyl monomers can be used singly or they can be used in combinations of 2 or more. When a hydroxyl-group-containing compound represented by General Formula (2) above is used, a hydroxyl-group-containing acrylic resin is obtained which includes structural units represented by the aforementioned General Formula (1). By using this Chemicals product Fluonate and the Toagosei Chemicals product Zafron (all trade marks), etc.

Compounds containing amino groups as component (A) include aliphatic and aromatic diamino compounds and polyamino compounds, and polyamino compounds obtained by reducing the products of cyanoethylation of aforementioned compounds containing hydroxyl groups.

Compounds containing epoxy groups as component (A) include bisphenolic epoxy resins, alicyclic epoxy resins, homopolymers or copolymers of glycidyl (meth)acrylate and/or 3,4-epoxycyclohexylmethyl (meth)acrylate, etc., and polyglycidyl compounds obtained by reacting a polycarbonxylic acid and/or polyol with epichlorhydrin.

Compounds containing amide groups as component (A) include homopolymers and copolymers of ",$-unsaturated monomers containing an amide group, such as acrylamide, etc.

Examples of compounds containing urethane groups as component (A) include polyurethane compounds obtained by reacting a compound containing a hydroxyl group with a compound containing an isocyanate group.

Compounds containing active methylene groups as component (A) include homopolymers and copolymers of ",$-unsaturated compounds containing an active methylene group, such as acetoacetoxyethyl (meth)acrylate, etc.

A single compound (A) which has per molecule at least 2 functional groups which can react with isocyanate groups, such as hydroxyl groups, amino groups, epoxy groups, amide groups, urethane groups or active methylene groups, etc., can be employed, or a combination of 2 or more can be employed.

Component (B) employed in the present invention is a blocked isocyanate which has per molecule at least 2 isocyanate groups which are blocked with an azole type blocking agent. As the isocyanate before blocking of the isocyanate group non-yellowing polyisocyanates are preferred; examples include aliphatic or alicyclic diisocyanates, such as hexamethylene diisocyanate, trimethylhexamethylene diisocyanate, isophorone diisocyanate, hydrogenated diphenylmethane diisocyanate and hydrogenated xylene diisocyanate, etc., and isocyanurates, biurets and adduct forms of these polyisocyanates, etc.

Azole type blocking agents which can block the isocyanate groups of the polyisocyanate compounds above include pyrazole and pyrazole derivatives, such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, 3-methyl-5-phenylpyrazole, etc., imidazole and imidazole and imidazole derivatives such as imidazole, benzimidazole, 2-methylimidazole, 2-ethylimidazole and 2-phenylimidazole, etc., and imidazole derivatives such as 2-methylimidazoline and 2-phenylimidazoline, etc., Of these, pyrazole or a pyrazole derivative is preferred.

A single blocked isocyanate of component (B) can be employed, or a combination of 2 or more can be employed.

A known method can be adopted for making blocked isocyanates in which the isocyanate groups of an aforementioned isocyanate are blocked by an aforementioned azole blocking agent; for example, they can be made by reacting an azole blocking agent and an isocyanate in the presence of a catalyst such as dibutyltin dilaurate in an inert solvent such as toluene, etc., under an inert gas.

As an ultraviolet (UV) absorber of component (C), benzotriazole compounds, oxaloanilide compounds, triazine compounds, benzophenone compounds or cyanoacrylate compounds, etc., can be employed.

Examples of benzotriazole compounds as component (C) include 2-(2-[2-hydroxy-3,5-di-(1,1-dimethylbenzyl)-phenyl]-2H-benzotriazole and methyl-3-(3-2H-benzotriazol-2-yl)-5-t-butyl-4-hydroxyphenyl propionate, and 2-(2'-hydroxy-5'-methacryloxyethylphenyl)-2H-benzotriazole, which can be free-radical copolymerized readily with other vinyl monomers, etc.

Examples of an oxalic anilide compound as aforementioned component (C) include ethanediad[?]-o-N-(2-ethoxyphenyl)-N'-(4-isodoceylphenyl)oxalic anilide, etc.

Examples of a triazine compound as aforementioned component (C) include 2-{4-[(2-hydroxy-3-dodecyloxy-propyl)-oxy]-2-hydroxyphenyl}-4,6-bis(2,4-dimethylphenyl)-1,3,5-triazine, etc.

Examples of a benzophenone compound as aforementioned component (C) include 2,2'-dihydroxy-4,4'-dimethoxybenzophenone, etc.

Examples of a cyanoacrylate compound as aforementioned component (C) include ethyl-2-cyano-3,3-diphenyl acrylate, etc.

A single ultraviolet absorber can be employed, or a combination of 2 or more can be employed.

As a free radical scavenger of component (C) employed in the present invention a hindered amine compound or hindered phenol compound can be employed.

Examples of hindered amine compounds as component (C) above include bis(1,2,2,6,6-pentamethyl-piperidyl) sebacate, and 1,2,2,6,6-pentamethyl-4-piperidyl methacrylate, which copolymerizes readily with other vinyl monomers.

Examples of hindered phenol compounds as aforementioned component (C) include tetrakis[methylene-(3,5-di-t-butyl-4-hydroxyhydroxycinnamato)]methane, etc.

A single free radical scavenger can be employed, or a combination of 2 or more can be employed. Similarly, an ultraviolet absorber and free radical scavenger can be used concomitantly or singly, but paint films with better weather resistance are obtained by using them concomitantly.

The organotin compound of compound (D) employed in the present invention is included as a catalyst for unblocking the blocked isocyanate groups and a catalyst for crosslinking the isocyanate groups, and examples include dibutyltin dilaurate, tin octanoate and tetra-n-butyl-1,3-diacetyloxydistanoxane, etc.

As the amino resin (E) employed in the present invention alkylated amino resins can be employed, and alkylated melamine resins, such as butylated melamine resin, methylated melamine resin and butylated/methylated mixed melamine resins, etc., are preferably employed. Such alkylated melamine resins can be made by methylolating an amino resin such as a melamine, benzoguanamine, glycolyl, cyclohexylguanamine or urea resin, and forming this into an ether with a C1-6 alkanol or cyclohexanol.

Commercial amino resins can also be used as component (E): examples include Mitsui Cyanamid products Cymel and Mycote, Mitsui Toatsu Chemical product Yuban and Dainippon Ink & Chemicals Superbeckamin (all trade marks), etc.

A single amino resin (E) can be employed, or a combination of 2 or more can be employed.

The properties of aforementioned components (A)–(E) in thermosetting paint compositions of the present invention as contents of the paint-film-forming components are component (A) 49.6–90 wt %, and preferably 55–80 wt %, component (B) 9.6–50 wt %, and preferably 12–45 wt %, component (C) 0.2–5 wt %, and preferably 1–4.5 wt %, component (D) 0.1–3 wt %, and preferably 0.2–2 wt %, component (E) 0.1–30 wt %, and preferably 0.2–25 wt %. When each of the components is in the ranges above it is possible to form paint films of outstanding resistance to yellowing due to brass, low-temperature curability, weather resistance, resistance to yellowing after stoving, acid resistance, scratch resistance, solvent resistance, adhesion and appearance.

When the content of component (A) is smaller than the lower limit above adequate paint film strength is not obtained and there is an adverse effect on the solvent resistance of the paint film; and adequate paint film strength is also not obtained, with adverse effects on solvent resistance, when it exceeds the upper limit. When the content of component (B) is smaller than the lower limit above acid resistance is lowered, and when it exceeds the upper limit the appearance of the hardened paint film becomes poor. When the content of component (C) is smaller the lower limit above weather resistance is lowered, and when it exceeds the upper limit water resistance becomes inadequate. When the content of component (D) is smaller than the upper limit above adequate crosslinking density is not obtained and solvent resistance is lowered, and if it exceeds the upper limit water resistance is inadequate. When the content of component (E) is smaller than the lower limit above low-temperature curability is lowered, and if it exceeds the upper limit acid resistance becomes inadequate.

In addition to the essential components of (A)–(E) above, blocked isocyanates other than component (B) above, i.e. blocked isocyanates in which the isocyanate groups are blocked by a compound other than an azole blocking agent, can optionally be included in thermosetting paint compositions of the present invention as blocked isocyanate adjuncts.

The isocyanate before the blocking of the isocyanate group is preferably a non-yellowing polyisocyanate compound; examples include polyisocyanates such as hexamethylene diisocyanate, trimethylhexamethylene diisocyanate, isophorone diisocyanate, hydrogenated diphenylmethane diisocyanate and hydrogenated xylene diisocyanate, etc., and isocyanurates, biurets and adduct forms of these polyisocyanates, etc.

Examples of compounds other than azole blocking agents for blocking the isocyanates above include malonic acid esters having a C1-4 alkyl group, such as malonic acid diethyl ester and malonic acid dibutyl ester, etc., acetoacetic acid esters having a C1-4 alkyl group, such as ethyl acetoacetate and t-butyl acetoacetate, etc., and oxime components such as acetone oxime, methyl ethyl ketone oxime, cyclohexanone oxime, acetophenone oxime and benzophenone oxime, etc.

A single blocked isocyanate other than component (B) can be employed, or a combination of 2 or more can be employed.

It is desirable that the quantity of blocked isocyanate other than component (B) which is included is 0–30 parts by weight, and is preferably 5–25 parts by weight, to a total of 100 parts by weight of components (A)–(E). When a blocked isocyanate blocked by an oxime compound is employed, a quantity which does not produce yellowing due to brass, ordinarily #10 parts by weight, is preferred. When the quantity of blocked isocyanate other than component (B) included exceeds 30 parts by weight the appearance and acid resistance of the hardened paint film are adversely affected.

As well as blocked isocyanates other than component (B), thermosetting paint compositions of the present invention can optionally include paint additives which are included in prior thermosetting paint compositions, including anti-yellowing agents such as hydroazine derivatives, etc., pigments, organic solvents, surface adjusting agents, viscosity adjusting agents and hardening catalysts, etc.

Pigments above include metallic pigments such as aluminum powders and mica powders, and colored pigments, etc.

Any solvent in which a thermosetting paint composition of the present invention can be dissolved or dispersed can be employed as an organic solvent above, without restriction; examples include hydrocarbon solvents such as hexane, heptane, octane, toluene and xylene, etc., alcohol solvents such as methanol, ethanol, isopropanol, butanol, amino alcohols, 2-ethylhexyl alcohol and cyclohexanol, etc., ether solvents such as hexyl ether, dioxane, ethylene glycol monomethyl ether, ethylene glycol monoethyl ether, ethylene glycol monobutyl ether, ethylene glycol diethyl ether and diethylene glycol monobutyl ether, etc., ketone solvents such as methyl ethyl ketone, methyl isobutyl ketone, cyclohexanone and isophorone, etc., ester solvents such as ethyl acetate, butyl acetate, amyl acetate, ethylene glycol acetate ester ethyl ethers and diethylene glycol acetic acid ester monoethyl ethers, etc., and aromatic petroleum derivatives such as Solvesso #100 and Solvesso #150 (Shell Chemicals trade marks), etc.

Thermosetting paint compositions of the present invention can be made by formulating components (A)–(E) and other optionally included components in proportions giving the aforementioned contents, and mixing by an ordinary method using an ordinary paint mixing means.

Thermosetting paint compositions of the present invention obtained as above can be used as top finishing coat paints; for this they can be clear coat paints or colored paints which include a pigment.

There are no specific restrictions as to materials of objects to be painted with paints comprising a thermosetting paint composition of the present invention, and they can be used to paint metals such as sheet steel and surface treated sheet steel, etc., and plastics, etc. Thermosetting paint compositions of the present invention can be coated directly onto these materials to be painted, or coated onto the surface of a paint film after applying a primer or primer/middle coat. In concrete terms, they can be employed as top finishing coat paints for automobiles, other vehicles, buildings and structures, etc., and are particularly preferable as one-pack top coat paints for automobiles.

When thermosetting paint compositions of the present invention are employed as clear finishing coat paints, a base finishing coat paint is coated onto the surface of the object to be painted and a thermosetting paint composition of the present invention is coated on top of this. In this case, the paint composition of the present invention can be painted onto the base coat paint film after hardening, however the paint composition is preferably painted onto the uncured base paint film in the semi-hardened state, and then stoved with the base coat by the 2-coats/1-bake method. The paint film preferably has a dry film thickness of the order of 10–60 :m, and the preferred stoving conditions for curing are a temperature of ca. 110 to ca. 160EC for a time of the order of 10–40 minutes.

As the paints employed for primer painting, electrocoating, middle coat painting and the paint employed for the base finishing coat when a thermosetting paint composition of the present invention is employed as a top finishing coat, generally paints suitable for metal, plastic or wooden surfaces can be employed. Examples of such paints include paints including nitrocellulose-modified acrylic lacquers, cellulose-acetate-butyrate-modified acrylate lacquers, acrylurethane or polyurethane, and paints in which the principal component of the vehicle is an aminoacrylic resin, an amino-alkyd resin or an amino-polyester resin, etc. There are no specific restrictions as to the forms of these paints, and any form can be employed such as solutions in organic solvents, non-aqueous dispersions, aqueous solutions, aqueous dispersions, powder paints and high-solid paints, etc.

In prior paint compositions yellowing due to brass, with yellowing of the paint film after stoving, is produced if copper ions are eluted into paint from brass components present in the paintmaking process or in paint pipes, valves and couplings, etc., of the painting line. The cause of yellowing due to brass is through to be the formation of complexes between copper ions and compounds in the paint, and the main compounds which form complexes with copper ions would seem to be isocyanate group blocking agents.

In thermosetting paint compositions of the present invention yellowing due to brass is not produced due to contamination of paint with copper ions because azole compounds are used as isocyanate group blocking agents. The reaction is thought to be that either azole compounds do not form complexes with copper ions, or if they do form complexes these complexes do not give rise to yellowing.

Paint films formed from thermosetting paint compositions of the present invention also have outstanding weather resistance. It is suggested that this is because azole compound are more prone than other blocking agents to remain within the hardened paint film, and the residual azole compound interacts with the ultraviolet absorber and/or free radical scavenger, and due to this synergistic effect better weather resistance is obtained than when using an ultraviolet absorber and/or free radical scavenger alone.

Since thermosetting paint compositions of the present invention contain specified quantities of a polymer which has at least 2 functional groups in the molecule which can react with isocyanate groups, and a blocked isocyanate which has at least 2 isocyanate groups in the molecule that are blocked with an azole blocking agent, and an ultraviolet absorber and/or free radical scavenger, and an organotin compound, and an amino resin, they are resistant to yellowing due to brass and can also form paint films of outstanding resistance to yellowing, low-temperature curability, weather resistance, yellowing after stoving resistance, scratch resistance, solvent resistance, adhesion and finished appearance.

The present invention is explained in more detail below by means of embodiments and comparison examples. Unless otherwise stated, "parts" and "%" signify "parts by weight" and "wt %" respectively.

REFERENCE EXAMPLE 1

Making base finishing coat paint

Styrene 150 parts, methyl methacrylate 280 parts, butyl methacrylate 400 parts, 2-hydroxyethyl methacrylate 150 parts and acrylic acid 20 parts were copolymerized in zylene using azobisisobutyronitrile as a polymerization initiator, to obtain an acrylic residue solution of heating residue 50%. The weight-average molecular weight of this acrylic resin by gel permeation chromatography (polystyrene equivalent) was 32,000. Base finishing coat paint was made using this acrylic resin solution in the formulation of Table 1.

TABLE 1

| Starting material | | Quantity (parts) |
|---|---|---|
| Acrylic resin solution | | 140 |
| Amino resin solution | *1 | 50 |
| CAB resin solution | *2 | 25 |
| Titanium oxide | *3 | 100 |
| UV absorber solution | *4 | 10 |

TABLE 1-continued

| Starting material | | Quantity (parts) |
|---|---|---|
| Photostabilizer solution | *5 | 5 |
| Levelling agent solution | *6 | 3 |

Table 1 Notes
*1 Mitsui Toatsu Chemicals Product Yuban 20SE (butylated melamine resin, trade mark)
*2 Eastman product CAB381-2 (cellulose acetate butyrate resin, trade mark), 20% butyl acetate solution
*3 Teikoku Kako product Teikatitan JR602, trade mark
*4 Ciba Geigy product Tinuvin 900 (trade mark), 10% xylene solution
*5 Sankyo product Sanol LS292 (trade mark), 20% xylene solution
*6 Monsanto product Modaflow (trade mark), 20% xylene solution Next, this base finishing coat paint was diluted to 13 seconds with Ford cup No. 4 (20EC) using a thinner comprising toluene 50 parts, butyl acetate 30 parts and isobutyl alcohol 20 parts, before use in the embodiments described hereafter.

PREPARATION EXAMPLES 1–2

Making component (A): Vinyl copolymers A-1 and A-2

The quantities of xylene in Table 2 were loaded into 4-mouthed flasks fitted with a thermometer, stirrer, reflux cooler and dropping funnel, and the temperature was raised to 140EC. Then the mixture of monomers and polymerization initiator of Table 2 were added dropwise via the dropping funnel at an even speed over 2 hours. After completing the dropwise addition, reflux temperature was maintained and the contents cooled to 100EC. After cooling to 100EC the polymerization initiator mixtures of Table 2 were added dropwise at an even speed over 30 minutes. After this the polymerization was completed by maintaining a temperature of 100EC for a further 3 hours, to obtain solutions of vinyl copolymers A-1 and A-2 having the properties of Table 2.

TABLE 2

| | | Vinyl copolymer solution | |
|---|---|---|---|
| | | A-1 | A-2 |
| Xylene | | 61.2 | 60.7 |
| Components added dropwise (parts) | | | |
| 2-Hydroxyethyl methacrylate | | 32.5 | 27.8 |
| Acrylic acid | | 1.5 | 1.5 |
| 2-Ethylhexyl methacrylate | | 47.3 | 11.4 |
| Styrene | | 10 | — |
| Plaxel FM-2 | *1 | — | 12.7 |
| n-Butyl methacrylate | | 5.7 | 46.6 |
| t-Butyl peroxybenzoate | | 2.5 | 3 |
| Added catalyst (parts) | | | |
| t-Butylperoxy 2-ethylhexanoate | | 0.2 | 0.2 |
| Xylene | | 2.8 | 2.8 |
| Properties | | | |
| Heating residue (%) | | 60 | 60 |
| Weight-average molecular weight | | 10000 | 10000 |
| Glass transition temperature (EC) | | 27 | 18 |
| Hydroxyl group value (mg KOH/g) | | 140 | 140 |
| Acid value (mg KOH/g) | | 12 | 12 |

Notes Table 2
*1 Plaxel FM-2: Daicel Chemical Industries trade mark - monomer addition product of 1 mol of hydroxyethyl methacrylate and 2 mols of ,- caprolactone.

PREPARATION EXAMPLE 3
Component (A): Making vinyl copolymer A-3

Xylene 64.5 parts and Cardura E10 (trade mark Yuka Shell Epoxy, versatic acid glycidyl ester) 31.2 parts were put into a 4-mouthed flask fitted with a thermometer, stirrer, reflux cooler and dropping funnel, and stirred as the temperature was raised to 140EC. Then the mixture of monomers and polymerization initiator shown in Table 3 was added dropwise at a constant rate over 4 hours at 140EC. After 1 hour had passed after completing the dropwise addition, 0.2 parts of additional catalyst tertrabutylphosphonium acetate was added, and the reaction was completed by maintaining a temperature of 140EC for a further 2 hours, to make vinyl copolymer A-3 having the properties shown in Table 3.

TABLE 3

|  | Vinyl copolymer solution A-3 |
|---|---|
| Components loaded (parts) |  |
| Xylene | 64.5 |
| Cardura E10 | 31.2 |
| Components added dropwise (parts) |  |
| Methacrylic acid | 12.0 |
| 2-Hydroxyethyl methacrylate | 16.2 |
| n-Butyl methacrylate | 30.6 |
| Cyclohexyl methacrylate | 10.0 |
| t-Butyl peroxybenzoate | 2.0 |
| Added catalyst (parts) |  |
| Tetrabutylphosphonium acetate | 0.2 |
| Properties |  |
| Heating residue (%) | 60 |
| Weight-average molecular weight | 10000 |
| Glass transition temperature (EC) | 37 |
| Hydroxyl group value (mg KOH/g) | 140 |
| Acid value (mg KOH/g) | 10 |

PREPARATION EXAMPLE 4
Making Component (B): A blocked isocyanate comount (HDI-1)

Toluene 300 parts was put into a reaction vessel fitted with a thermometer, reflux cooler and stirrer, and then 3,5-dimethylpyrazole 52.8 parts and dibutyltin dilaurate 0.06 parts were added and stirred for 5 minutes at 25EC. Then hexamethylene diisocyanate (also abbreviated to EDI hereafter) isocyanate trimer (Duranate TFA, solids 100%, isocyanate group (NCO) content 23.1%, trademark Asahi Chemical Industry) 100 parts dissolved in toluene 200 parts was added gradually while the contents of the reaction vessel were maintained at #30EC under an atmosphere of nitrogen. After the disappearance of free isocyanate groups had been confirmed by IR, the solvent was removed replacing toluene by Solvesso #100, to obtain a blocked isocyanate in which all of the isocyanate groups were blocked with 3,5-dimethylpyrazole. This compound is abbreviated hereafter to HDI-1. This HDI-1 had 60% solids and NCO%= 9.1%.

PREPARATION EXAMPLE 5
Making Component (B): A blocked isocyanate compound (IPD1)

Toluene 300 parts was put into a reaction vessel fitted with a thermometer, reflux cooler and stirrer, and then 3,5-dimethyltriazole 38.2 parts and dibutyltin dilaurate 0.06 parts were added and stirred for 5 minutes at 25EC. Then isophorone diisocyanate isocyanurate trimer (Desmodure Z4370, solids 70%, isocyanate group content 11.7%, trademark Sumitomo-Bayer) 142.9 parts dissolved in toluene 200 parts was added gradually while the contents of the reaction vessel were maintained at #30EC under an atmosphere of nitrogen. This solution was heated for 2 hours under reflux at 110EC. After the disappearance of free isocyanate groups had been confirmed by IR, the solvent was removed, replacing toluene by Solvesso #100, to obtain a blocked isocyanate in which all of the isocyanate groups were blocked with 3,5-dimethylpyrazole. This compound is abbreviated hereafter to IPDI-1. This IPDI-1 had 60% solids and NCO%= 7.3%.

EMBODIMENTS 1–8, COMPARISON EXAMPLES 1–3

Clear coat paints were made to the formulations shown in Tables 4–6 using components (A) and components (B) obtained in Preparation Examples 1–5. Then these clear cost paints were adjusted to 25 seconds (Ford cup No. 4/20EC) with a thinner of composition Solvesso #150/n-butanol=90/ 10 (w/w). Paint films were formed by coating these paints by the method below, and paint film performance was tested.

Aqua No. 4200 (electrocoat paint, trade mark Nippon Oil & Fats) was coated onto zinc-phosphate-treated sheet steel to give a dry film thickness of 20 :m, and after hardening at 175EC for 20 minutes Haiepko No. 100 white (middle coat paint, Nippon Oil & Fats trade mark) was coated on to give a dry film thickness of 40 :m, and hardened at 140EC for 20 minutes.

The base finishing coat paint of Table 1 (base finishing coat of Reference Example 1) was coated onto this paint film by air spraying to give a dry film thickness of 15 :m, and after drying at room temperature for 3 minutes the clear coat paint solutions of Tables 4 to Table 6 were respectively coated on by air spraying to give a dry film thickness of 40 :m, and hardened at 140EC for 20 minutes to give thermoset test pieces. The resulting test pieces were investigated for paint film performance. The test pieces for low-temperature curability, resistance to yellowing due to brass and yellowing after stoving were made with the stoving conditions shown in the notes to Table 7. The results are shown in Table 7.

Test pieces thermoset after coating the clear coat paints of Table 4 to Table 6 directly onto Haiepiko No. 100 Black (middle coat paint, Nippon Oil & Fats trade mark) and tested for scratch resistance. The results are shown in Table 7.

TABLE 4

|  |  |  | Embodiments | | Units:parts | |
|---|---|---|---|---|---|---|
|  |  |  | 1 | 2 | 3 | 4 |
| (A) | Vinyl copolymer sol'n A-1 |  | 98.5 | — | — | — |
| (A) | Vinyl copolymer sol'n A-2 |  | — | 95.8 | — | 100.0 |
| (A) | Vinyl copolymer sol'n A-3 |  | — | — | 93.8 | — |
| (B) | HDI-1 | *1 | 68.2 | 47.2 | 48.6 | 33.3 |
| (B) | IPDI-1 | *2 | — | 23.7 | — | — |
| (C) | Tinuvin 900 | *3 | 20.0 | 10.0 | 30.0 | 5.0 |
| (C) | Sandovar 3206 | *4 | — | — | — | — |
| (C) | Tinuvin 400 | *5 | — | — | — | — |
| (C) | Tinuvin 123 | *6 | 10.0 | 10.0 | 10.0 | 10.0 |
| (C) | Irganox 1010 | *7 | — | — | — | — |
| (D) | DBTDL | *8 | 5.0 | 10.0 | 5.0 | 3.0 |
| (E) | Yuban 20SE | *9 | 0.5 | 0.5 | 0.5 | 33.3 |
| Adjunct | HDI-2 | *10 | — | — | — | — |
| Adjunct | HDI-3 | *11 | — | — | — | — |
| Adjunct | IPDI-2 | *12 | — | — | 24.3 | — |
| Additive | Modaflow | *13 | 0.1 | 0.1 | 0.1 | 0.1 |

TABLE 5

| | | | Embodiments (Units: parts) | | | |
|---|---|---|---|---|---|---|
| | | | 5 | 6 | 7 | 8 |
| (A) | Vinyl copolymer sol'n A-1 | | — | — | 133.0 | — |
| (A) | Vinyl copolymer sol'n A-2 | | 100.0 | 100.0 | — | — |
| (A) | Vinyl copolymer sol'n A-3 | | — | — | — | 100.0 |
| (B) | HDI-1 | *1 | 33.3 | 33.3 | 16.7 | 36.7 |
| (B) | IPDI-1 | *2 | — | — | 8.4 | — |
| (C) | Tinuvin 900 | *3 | — | — | 20.0 | 25.0 |
| (C) | Sandovar 3206 | *4 | 25.0 | — | — | — |
| (C) | Tinuvin 400 | *5 | — | 20.0 | — | — |
| (C) | Tinuvin 123 | *6 | — | 10.0 | 10.0 | 10.0 |
| (C) | Irganox 1010 | *7 | 10.0 | — | — | — |
| (D) | DBTDL | *8 | 5.0 | 5.0 | 5.0 | 5.0 |
| (E) | Yuban 20SE | *9 | 33.3 | 33.3 | 8.4 | 16.7 |
| Adjunct HDI-2 | | *10 | — | — | — | 13.3 |
| Adjunct HDI-3 | | *11 | — | — | — | — |
| Adjunct IPDI-2 | | *12 | — | — | — | 8.3 |
| Additive Modaflow | | *13 | 0.1 | 0.1 | 0.1 | 0.1 |

TABLE 6

| | | | Comparison Examples (Units: parts) | | |
|---|---|---|---|---|---|
| | | | 1 | 2 | 3 |
| (A) | Vinyl copolymer sol'n A-1 | | 98.5 | — | — |
| (A) | Vinyl copolymer sol'n A-2 | | — | 100.0 | — |
| (A) | Vinyl copolymer sol'n A-3 | | — | — | 158.3 |
| (B) | HDI-1 | *1 | 68.2 | — | 8.4 |
| (B) | IPDI-1 | *2 | — | — | — |
| (C) | Tinuvin 900 | *3 | — | 5.0 | 10.0 |
| (C) | Sandovar 3206 | *4 | — | — | — |
| (C) | Tinuvin 400 | *5 | — | — | — |
| (C) | Tinuvin 123 | *6 | — | 10.0 | 10.0 |
| (C) | Irganox 1010 | *7 | — | — | — |
| (D) | DBTDL | *8 | 5.0 | 5.0 | 5.0 |
| (E) | Yuban 20SE | *9 | — | 33.3 | — |
| Adjunct HDI-2 | | *10 | — | — | — |
| Adjunct HDI-3 | | *11 | — | 26.7 | — |
| Adjunct IPDI-2 | | *12 | — | — | — |
| Additive Modaflow | | *13 | 0.1 | 0.1 | 0.1 |

Notes Tables 4–6

*1 HDI-1: Blocked isocyanate - isocyanate groups of hexamethylene diisocyanate isocyanurate trimer completely blocked by 3,5-dimethylpyrazole. See Preparation Example 4

*2 IPDI-1: Blocked isocyanate - isocyanate groups of isophorone diisocyanurate trimer completely blocked by 3,5-dimethylpyrazole. See Preparation Example 5

*3 Tinuvin 900: Benzotriazole - type UV absorber Tinuvin 900 (trade mark Ciba Geigy) 10% solution in xylene

*4 Sandovar 3206: Oxaloanilide type UV absorber Sandovar 3206 (trade mark Sandoz) 10% solution in xylene

*5 Tinuvin 400: Triazine UV type UV absorber Tinuvin 400 (trade mark Ciba Geigy) 10% solution in xylene

*6 Tinuvin 123: Hindered amine type free radical scavenger Tinuvin 123 (trade mark Ciba Geigy) 10% solution in xylene

*7 Irganox 1010: Hindered phenol type free radical scavenger Irganox 1010 (trade mark Ciba Geigy) 10% solution in xylene

*8 DBTDL: Dibutyltin dilaurate, 10% solution in xylene

*9 Yuban 20SE: Butylated melamine, solids 60%, trade mark Mitsui Toatsu

*10 HDI-2: Blocked isocyanate - isocyanate groups in hexamethylene diisocyante isocyanurate trimer reacted with a 50/50 mixture of diethyl malonate and ethyl acetoacetate until the complete disappearance of free isocyanate groups. NCO = 7.6%, solids = 60%.

*11 HDI-3: Blocked isocyanate Desmodure BL3175, trade mark Sumitomo-Bayer - isocyanate groups of hexamethylene diisocyanate blocked by an oxime derivative. NCO = 11.1%, solids = 75%

*12 IPDI-2: Blocked isocyanate - isocyanate groups in isophorone diisocyante isocyanurate trimer reacted with a 33%/67% mixture of diethyl malonate and ethyl acetate until the complete disappearance of free isocyanate groups. NCO = 6.1%, solids 60%

*13 Modaflow: Levelling agent, trade mark Monsanto

TABLE 7

| | | Embodiments | | | | | | | | Comparisons | | |
|---|---|---|---|---|---|---|---|---|---|---|---|---|
| | | 1 | 2 | 3 | 4 | 5 | 6 | 7 | 6 | 1 | 2 | 3 |
| Resistance to yellowing due to brass | *1 | O | O | O | O | O | O | O | O | O | X | O |
| Low-temperature curability | *2 | O | O | O | O | O | O | O | O | X | O | X |
| Resistance to accelerated weathering | *3 | O | O | O | O | O | O | O | O | X | I | X |
| Resistance to yellowing after stoving | *4 | O | O | O | O | O | O | O | O | O | I | O |
| Resistance to acid | *5 | O | O | O | O | O | O | O | O | O | O | X |
| Resistance to scratching | *6 | I | O | I | O | O | O | I | I | X | X | X |
| Resistance to gasoline | *7 | O | O | O | O | O | O | O | O | O | O | X |
| Recoating adhesion | *8 | O | O | O | O | O | O | O | O | O | O | X |
| 60 E mirror surface gloss | *9 | 90 | 91 | 90 | 92 | 92 | 91 | 91 | 90 | 90 | 91 | 90 |

Notes Table 7

*1 Resistance to yellowing due to brass: 1 brass nut was put in to 200 ml of diluted clear coat paint and left for 24 hours at 50 EC, and state of yellowing of the paint film after subsequent stoving at 160 EC for 1 hour was examined.
O: hardly any visible change in the paint film
I: visible yellowing of the paint film
X: considerable yellowing of the paint film

*2 Low-temperature curability: The test piece was made under the aforementioned conditions for making test pieces with the sole modification that stoving was at 120 EC for 20 minutes. This test piece was secured horizontally, and gauze folded 4 times (3 cm × 3 cm) and soaked with ca 5 ml of xylene was rubbed backwards and forwards 5 times under a load of 500 g/9 cm². After this the gauze was discarded, the xylene was wiped off using a separate gauze, and then the state of the paint surface was examined.
O: no abnormality

TABLE 7-continued

|  | Embodiments | | | | | | | Comparisons | | |
|---|---|---|---|---|---|---|---|---|---|---|
| 1 | 2 | 3 | 4 | 5 | 6 | 7 | 6 | 1 | 2 | 3 |

X: decreased gloss and softening of the paint surface
*3 Resistance to accelerated weathering: The test pieces were examined visually for gloss, discoloration and staining after testing for 3000 hours with a carbon arc light sunshine tester (JIS K5400 (1990) 9.8.1)
O: hardly any visible change in the paint film
I: visible changes
X: visible staining and discoloration of the paint surface, considerably lowered gloss
*4 Resistance to yellowing after stoving: The clear coat paint was painted at a constant film thickness (40 :m) onto the base coat paint wet-on-wet and the stoved at 160 EC for 1 hour, and the paint film was examined for yellowing.
O: hardly any visible change in the paint film
I: visible yellowing of the paint film
X: paint film marked yellowed
*5 Acid resistance: 0.2 ml of 40% aqueous sulfuric acid was spotted onto the test piece, which was then heated at 60 EC for 15 minutes, after which it was washed with water and the degree of streaking was assessed visually.
O: no abnormality
X: streaking
*6 Resistance to scratching: The test piece was coated with muddy water (a mixture of JIS Z-8901-84 Type 8 dust/water/neutral detergent = 10/99/1 w/w/w) using a brush and then the cleaning brush of an automatic car wash was rotated over it at 150 rpm for 10 seconds, followed by washing in running water. The procedure above was repeated twice, and then the degree of scratching of the surface of the test piece was determined by measuring the L* value by means of a color-difference meter (Minolta Cameras CR-331). )L* was calculated by the following equation, and scratching resistance was assessed from the value thereof.
)L* = L* after test-L* before test
O: )L* <3
I: 4 > )L* $3
X: )L* $5
*7 Resistance to gasoline: The test piece was immersed for 7 hours in regular gasoline at 20 EC, and then the paint film was examined visually for swelling, discoloration and peeling.
*8 Recoating adhesion: A second coat of base coat paint and clear coat paint were coated onto a test piece which had been coated with a base coat paint and clear coat paint by the aformentioned coating method, and were then stoved under the same conditions, 2-mm crosshatching was then performed and the adhesion test of JIS K-5400 (1990) 8.5 was performed, and the state of detachment of the paint film was assessed visually.
O: no abnormality
X: partial detachment
*9 60 E Mirror surface gloss: JIS K-5400 7.6.60 60 E mirror surface gloss From the results shown it is evident that paint films obtained from thermosetting paint compositions of the embodiments are outstanding in resistance to yellowing due to bras, low-temperature curability, weather resistance, resistance to yellowing after stoving, acid resistance, scratch resistance, gasoline resistance, adhesion and appearance.

By contrast, with Comparison Example 1 weather resistance was poor because it did not include a UV absorber or free radical scavenger corresponding to components (C) and (E).

With Composition Example 2 resistance to yellowing due to brass and resistance to yellowing after stoving were poor because it did not include a blocked isocyanate corresponding to component (B) in which the cyanate groups were blocked by a pyrazole blocking agent, but instead included a blocked isocyanate blocked with an oxime derivative.

Comparison Example 3 did not include a component (E), and the quantity of component (B) was also too small, and consequently it was not possible to get an adequate degree of crosslinking, and therefore weather resistance, acid resistance and gasoline resistance were poor.

What is claimed is:

1. A thermosetting paint composition resistant to yellowing due to brass, comprising:

(A) a compound which has per molecule at least 2 functional groups which can react with an isocyanate group, at 49.6–90 wt %, (B) a blocked isocyanate which has per molecule at least 2 isocyanate groups blocked by an azole blocking agent, at 9.6–50 wt %, (C) a component selected from the group consisting of ultraviolet absorbers, free radical scavengers, and mixtures thereof, at 0.2–5 wt %, (D) an organotin compound at 0.1–3 wt %, and (E) an amino resin at 0.1–30 wt %.

2. The thermosetting paint composition of claim 1, in which the functional groups in component (A) are selected from the group consisting of hydroxyl groups, amino groups, epoxy groups, amide groups, urethane groups, active methylene groups and mixtures thereof.

3. The thermosetting paint composition claim 1, in which component (A) is an acrylic resin comprising hydroxyl groups.

4. The thermosetting paint composition claim 1, in which component (A) is a polymer comprising a structural unit represented by the general formula (I)

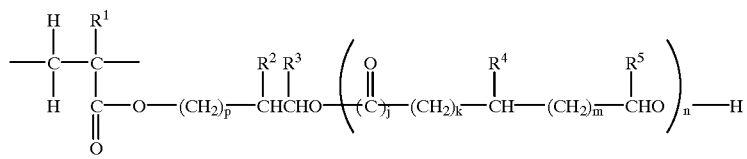

(In the formula $R^1$–$R^5$, which can the same or different, are a hydrogen atom or a methyl group, p is an integer 0–2, j is an integer 0–3, m is an integer 0–3, and n is an integer 1–10.).

5. The thermosetting paint composition of claim 1, in which component (B) is a polyisocyanate resin selected from the group consisting of aliphatic polyisocyanates, alicyclic polyisocyanates, and mixtures thereof, in which the isocyanate groups are blocked by a blocking agent selected from the group consisting of pyrazole, pyrazole derivatives, and mixtures thereof.

6. The thermosetting paint composition of claim 1, wherein component (C) comprises an ultraviolet absorbing agent selected from the group consisting of a benzotriazole compound, an oxalic anilide compound, a triazine compound, a benzophenone compound, a cyanoacrylate compound, and mixtures thereof.

7. The thermosetting paint composition of claim 1, wherein component (C) comprises a free radical scavenger selected from the group consisting of a hindered amine compound, a hindered phenol compound and mixtures thereof.

8. The thermosetting paint composition of claim 1, further comprising a blocked isocyanate other than component (B), in a proportion of 0–30 parts by weight to 100 parts by weight of the total of components (A)–(E).

* * * * *

UNITED STATES PATENT AND TRADEMARK OFFICE
CERTIFICATE OF CORRECTION

PATENT NO. : 6,025,433
DATED : February 15, 2000
INVENTOR(S) : Shibatoh et al.

Page 1 of 1

It is certified that error appears in the above-identified patent and that said Letters Patent is hereby corrected as shown below:

Column 16,
Line 51, after "wt %", please insert -- based on the total weight of components (A)-(E) --;
Line 57, after "composition", and before "claim" please insert -- of --;
Line 60, after "composition", and before "claim" please insert -- of --;
Line 62, after "formula", please delete "(I)", and insert -- (1) --;

Column 17,
Line 12, please delete "(In the formula", and insert -- wherein --;
Line 12, after "$R^5$,", please delete "which".
Line 12, after "can", and before "the", please insert "be".
Line 12, after "different,", and before "are", please insert "and".
Line 13, after "0", and before "2", please delete "-", and insert -- to --.;
Line 14, after "0", and before "3", please delete "-", and insert -- to --;
Line 14, after "110", and before "3", please delete "-", and insert -- to --;
Line 15, after "1", and before "10", please delete "-", and insert -- to --;
Line 15, after "10.", please delete ").".

Signed and Sealed this

Twelfth Day of November, 2002

Attest:

Attesting Officer

JAMES E. ROGAN
Director of the United States Patent and Trademark Office